Feb. 26, 1952 L. E. BLACK ET AL 2,587,100
PULSE JET THRUST ENGINE
Filed April 11, 1946

INVENTORS
LEROY E. BLACK
CHARLES B. MARKS
BY WILLIAM L. TENNEY

Paul, Paul & Moore
ATTORNEYS

Patented Feb. 26, 1952

2,587,100

UNITED STATES PATENT OFFICE 2,587,100

PULSE JET THRUST ENGINE

Leroy E. Black and Charles B. Marks, Las Vegas, Nev., and William L. Tenney, Crystal Bay, Minn.; said Black and Marks assignors to said Tenney Application April 11, 1946, Serial No. 661,280

3 Claims. (Cl. 60—35.6)

This invention relates to pulse jet engines and more particularly to tail pipe constructions therefor. The construction of pulse jet engines customarily includes a combustion chamber in which a combustible mixture of fuel and air or other combustible constituents is introduced intermittently into the combustion chamber and there exploded. The combustion chamber is provided with a suitable inlet opening and with a valve arrangement controlling the inlet opening, although the inlet may be made to operate as a restricted flow orifice or in accordance with the ram jet effect, if desired. From the combustion chamber there also extends one or more exhaust pipes from which the exhaust gases issue at high velocity, and produce the jet thrust of the engine.

It is an object of the present invention to provide an improved pulse jet engine having increased jet thrust for a given weight and size of engine. More particularly it is an object of the invention to provide a pulse jet engine wherein the exhaust pipe or pipes has a gradually increasing cross sectional area towards the exhaust end and increased large thrust per unit of engine weight and size and increased fuel efficiency.

Other and further objects of the invention are those inherent in the apparatus herein illustrated, described and claimed.

The invention is illustrated with reference to the drawing in which

Figures 1 and 2 are comparative views illustrating a conventional pulse jet engine of straight tail pipe construction and Figure 2 the improved, expanded tail pipe construction of the present invention.

Figures 3 and 4 are likewise comparative views illustrating a straight tail pipe construction and expanded tail pipe construction, respectively.

Figures 5 and 6 are likewise comparative views illustrating the straight and expanded tail pipe construction.

Throughout the drawing corresponding numerals refer to the same parts.

Figure 1:
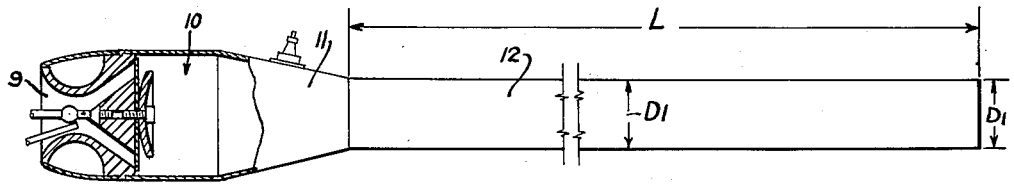
Figures 1 through 6 are side elevational views, partly in cross-sections, of pulse jet engines.

Referring to the drawing in Figure 1 there is illustrated a pulse jet engine having a combustion chamber generally designated 10 with an air inlet end 9. The particular details of the combustion chamber, air inlet, fuel feeding mechanism, etc., per se, form no part of the present invention and may be of any desired type, such as that illustrated in a copending application of Wm. L. Tenney and Charles B. Marks, Ser. No. 649,882, filed February 25, 1946, to which reefrence is here made.

In the descriptions and specific illustrations hereinafter given the construction of the combustion chamber, inlet end 9 and tapered portion 11 and the valved inlet aperture, fuel feeding mechanism, etc., are of the type described in the aforesaid application Ser. No. 649,882, except that in the specific illustrations herein referred to the valve plate has a circle of eight inlet apertures $\frac{1}{2}$ inch in diameter rather than 16 apertures one-fourth inch in diameter, as mentioned in a specific example of the aforesaid application. The illustrations herein given show the combustion chamber as having one exhaust pipe, but it will be understood that multiple exhaust pipes may be used.

Figure 2:
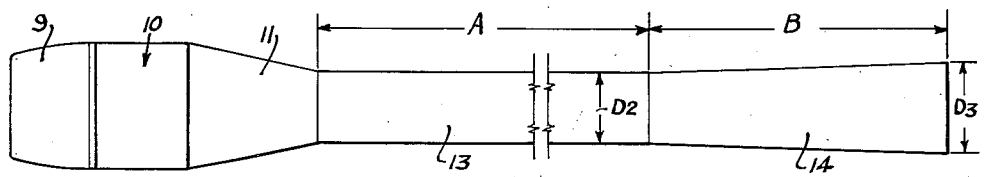

In Figure 1 of the present invention tail pipe 12 is of constant diameter throughout its entire length L, whereas in Figure 2, the tail pipe has a straight section 13 throughout a portion of its length and a section 14 which gradually increases in cross-sectional area from the size of section 13 to a larger size at the rear or exhaust end.

As a specific illustration, which is included herein merely by way of example and not as a limitation, the tail pipe 12 in Figure 1 has a diameter D1 of 1.375 inches and a length L of 15 inches. When using an 8-holed valve inlet and valve of the type mentioned in our application Ser. No. 649,882, the unit of Figure 1 produced a thrust of 2.5 pounds. By changing the tail pipe to the form shown in Figure 2, so as to have a section 13 in which dimension A is 9 inches, the diameter D2 is 1.375 inches and a section 14 in which dimension B is 6 inches and in which the diameter increases gradually from 1.375 inches to a diameter D3 at the exhaust end of 1.75 inches, the resultant static thrust was increased to 3.25 pounds. Thus, by changing only the tail pipe, to materially increase its cross sectional area but not substantially in excess of a critical range of about 162 percent thereof, there was provided an increase of 0.75 pound thrust (30%) without any other changes in the apparatus.

Figure 3:
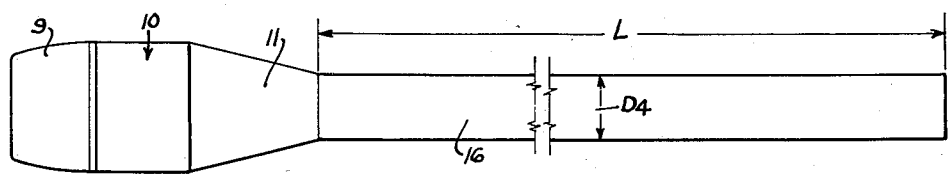
Figure 4:
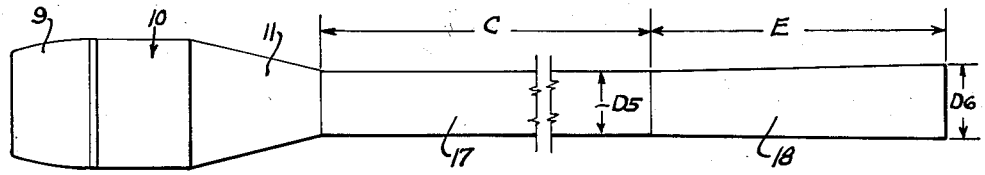

Figures 3 and 4 are a further specific illustration of the effect of the tail pipe. In these figures, as in Figures 1 and 2, there is utilized a combustion chamber 10, tapered section 11 and inlet mechanism 9 and a straight tail pipe 16 of the type shown in said application Ser. No. 649,882. In Figure 3, the tail pipe 16 has a diameter D4 of 1.25 inches and a length L of 15 inches. So proportioned, the unit produced a thrust of 2.2 pounds. By changing the tail pipe to the configuration shown in Figure 4, that is to say, having a straight section 17 which has a dimension C of 9 inches and a diameter D5 of 1.25 inches connected to a tapered section 18 which has a uniformly increasing diameter from 1.25 inches at the small end to a diameter D6 of 1.375 inches and a dimension E of 6 inches, the thrust was increased to 2.75 pounds. It was thus possible to achieve a gain of 0.55 pound (or 25%) thrust for the unit shown in Figure 4, as compared with the unit shown in Figure 3 by merely changing the tail pipe in accordance with the present invention.

Figure 5:
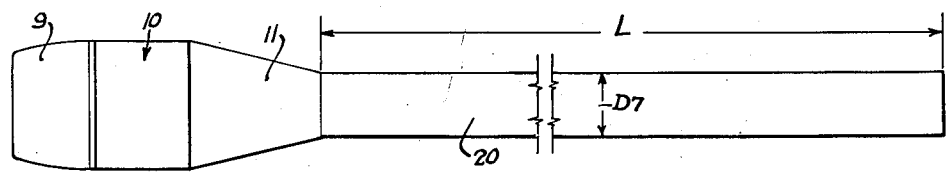
Figure 6:
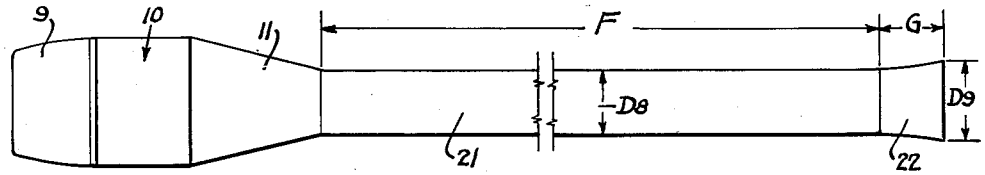

In Figures 5 and 6 the combustion chamber and tapered portion 11 were the same as in the previously described construction, but the intake passage and valve plate had ten holes .344 inch in diameter rather than 16 holes .25 inch in diameter, as described in the specific example of the aforesaid application. In the construction shown in Figure 5 the tail pipe 20 had a diameter D7 of 1.25 inches and a length L of 15 inches and produced 2.5 pounds thrust. In Figure 6 the tail pipe consisted of a portion 21 having a length F of 13.75 inches and a diameter D8 of 1.25 inches and having a bell-shaped portion 22 which had a length G of 1.25 inches and a diameter increasing gradually from diameter D8 thence along a curved surface, as illustrated, to a maximum diameter D9 of 1.5 inches at its end. With this change in tail pipe construction in Figure 6, but with all other factors of the units the same, the static thrust was increased to 3.25 pounds or .75 pound (30%) increase over that shown in Figure 5.

It will thus be observed that by providing a tail pipe having a straight portion and a terminal portion of gradually increasing cross-sectional area, it is possible without any other changes in the unit, to provide a substantial increase in the static thrust of the pulse jet engine with consequent marked increase in efficiency of the unit.

The foregoing specific examples and dimensions given are included to illustrate specific examples of the invention and merely to show the increase in thrust obtainable by using a tail pipe having a straight portion of constant cross-section throughout a part of its length and a portion of gradually increasing cross-section throughout a terminal portion of its length, as compared with the thrust obtainable when utilizing a tail pipe of constant cross-section throughout its entire length. It is therefore strictly to be understood that the specific examples are not a limitation upon the invention defined in the appended claims.

As many apparently widely different embodiments of this invention may be made without departing from the spirit and scope thereof, it is to be understood that we do not limit ourselves to the specific embodiments herein except as defined by the appended claims.

What we claim is:

1. A resonant pulse jet device comprising a combustion chamber having internal walls adapted for the rapid pulsating flow of gases therethrough, means including an intake passage for introducing combustible constituents into the combustion chamber, an exhaust pipe opening directly and freely into said combustion chamber and forming with said combustion chamber a system resonant in gases, said exhaust pipe having its forward portion of its length of substantially uniform cross-sectional area and having a terminal portion of its length in which the cross-sectional area at the exhaust end is materially greater than the cross-sectional area of said forward portion but not substantially in excess of the critical range of about 162 per cent thereof.

2. A resonant pulse jet device in accordance with claim 1 in which the terminal portion is substantially bell shaped.

3. A resonant pulse jet device in accordance with claim 1 in which the terminal portion has a length substantially less than that of the portion of uniform cross-sectional area.

LEROY E. BLACK.
CHARLES B. MARKS.
WILLIAM L. TENNEY.

REFERENCES CITED

The following references are of record in the file of this patent:

UNITED STATES PATENTS

| Number | Name | Date |
| --- | --- | --- |
| 1,369,672 | Koenig | Feb. 22, 1921 |
| 2,480,626 | Bodine | Aug. 20, 1949 |

FOREIGN PATENTS

| Number | Country | Date |
| --- | --- | --- |
| 412,478 | France | May 3, 1910 |